Figure 1:
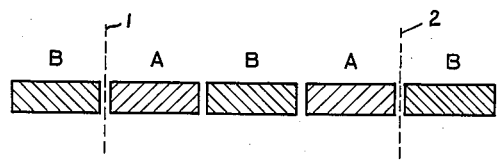

2,978,570
Patented Apr. 4, 1961

2,978,570
METHOD OF JOINING THERMOELECTRIC COMPONENTS

Walter Hänlein, Erlangen, and Ulrich Birkholz, Nurnberg, Germany, assignors to Siemens-Schuckertwerke Aktiengesellschaft, Berlin-Siemensstadt and Erlangen, Germany, a corporation of Germany Filed July 10, 1959, Ser. No. 826,175

Claims priority, application Germany July 24, 1958

12 Claims. (Cl. 219—85)

Our invention relates to a method of joining the components of thermocouples or thermopiles by soldering.

The soldering of such thermoelectric combinations involves considerable difficulties because it is essential to obtain minimum transfer resistances at the solder joints. Several known methods aim at reducing this resistance. For example, it has been proposed to perform the soldering operation in a non-oxidizing atmosphere under the effect of ultrasonic vibrations.

It is an object of our invention to provide a soldering method for thermoelectric components which not only minimizes the transfer resistance but which, by virtue of its simplicity, is particularly well suitable for industrial large-scale production of thermoelectric devices.

According to the invention, we utilize the Peltier effect for performing the soldering operation. For this purpose, we place an intermediate layer or foil of solder substance between the areas of the thermoelectric components to be joined, then subject the assembly of components and intermediate solder layers to mechanical pressure and pass through the assembly a direct current in such a direction that the places to be soldered form the hot junctions of the combination.

The eminent suitability of the invention for mass production purposes is due to the fact that it affords a simultaneous and relatively rapid soldering of a large number of junctions. It is further essential that, with the method according to the invention, no oxidation can occur during soldering operation in the solder layer being processed, and that the sensitive semiconductor bodies preferably used as thermoelectric components are subjected to much smaller stresses than occurring with the soldering methods heretofore employed.

The method according to the invention is particularly applicable for the soldering of thermoelectric combinations that contain good conducting parts of metal between the thermoelectrically active members. In this case, each of the two thermoelectrically active members of a couple is kept under pressure between two metal pieces with respective intermediate layers of solder material, and the soldering of the two contact junctions is sequentially effected by passing through the assembly a direct current first in one and then in the other direction of current flow.

For intensifying the soldering operation, the soldering by means of electric current may be accompanied by simultaneous application of ultrasonic vibration and/or the assembly may be placed in a protective gas atmosphere for avoiding oxidation in the marginal zones of the assembly. In some cases it is necessary or desirable to first coat the areas to be soldered with a soldering-promotion substance such as iron or nickel, preferably while applying ultrasonics and a protective gas atmosphere. Such a coating can be applied, for example, by vaporizing it onto the area or by pressing the promoting substance upon the area.

Figure 2:
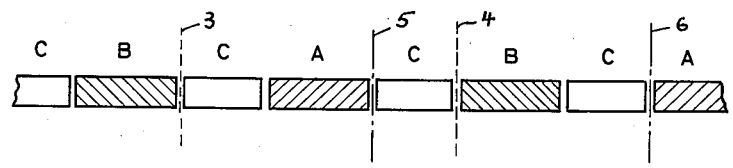

For further explaining the invention reference will be made to the drawing in which:

Fig. 1 illustrates schematically a thermoelectric assembly comprising a plurality of thermoelectrically active couples; and Fig. 2 shows schematically a thermoelectric combination comprising a number of couples with intermediate parts of good conducting metal.

In Fig. 1 the two thermoelectrically active components that form respective couples together with each other are denoted by A and B. These two components consist of thermoelectrically different material such as those described below. The joining of the combination by soldering is performed by first joining the three components A—B—A shown between the two vertical broken lines denoted by 1 and 2. This is done by pressing the three components together with respective foils of solder material placed between component B and each of the two adjacent components A. In this condition the assembly is connected to a direct current source so that the current flows first in one direction through the assembly, whereafter the polarity is reversed to pass the direct current in the opposite direction through the assembly. As a result, the two contact regions are soldered sequentially. The joining of the other components of the entire combination with the sub-assembly first completed is effected in the same manner.

In Fig. 2 the two different thermoelectric components are also denoted by A and B, but the combination comprises intermediate parts C of good conducting metal such as copper or aluminum. The soldering of such a combination can be effected by first pressing the three components C—A—C shown between the broken lines 3 and 4, together with intermediate layers of solder material and subsequently subjecting this sub-assembly to direct current first in one and then in the other direction. During this operation the metallic intermediate pieces C act as a thermoelectric component for producing the Peltier effect utilized for the fusing and soldering operation. In the next step the components C—B—C between lines 5 and 6 are soldered together in the same manner, whereafter the process is repeated until the entire thermoelectric combination is completed.

In the cases explained above with reference to Figs. 1 and 2, as well as when producing similar thermoelectric combinations, a large number of individual components, for example the entire series shown in Fig. 1 or in Fig. 2, can be simultaneously soldered by subjecting the series sequentially to direct-current in two directions.

The components A and B consist preferably of semiconductors because such substances exhibit a pronounced Peltier effect accompanied by low heat-conductance, thus securing the heat accumulation at the soldering localities required for the method according to the invention. Suitable as components A and B are, for instance, $Bi_2Te_3$, $Sb_2Te_3$, PbTe, PbSe, ZnSb, CdSb, or solid solutions of these compounds.

Applicable, for instance, are the following couple combinations:

(1) A=p-type $Bi_2Te_3$; B=n-type $Bi_2Te_3$
(2) A=p-type PbTe; B=n-type PbTe
(3) A=p-type PbTe; B=n-type PbSe
(4) A=p-type ZnSb; B=n-type CdSb
(5) A=p-type ZnSb; B=n-type Zn/Cd/Sb (solid solution)

For performing the above-described method, and as mentioned, it is generally necesary to first coat the junction areas of the components with solderable substance, for example with galvanically deposited nickel or iron. If the components consist of $Bi_2Te_3$ or $Sb_2Te_3$, the solderable coating may be formed by a bismuth or antimony alloy deposited, preferably in the molten state, with simultaneous application of ultrasonics. Some components, for example ZnSb, do not require the provision of such coatings.

The intermediate layer of solder substance may consist of the solder metals generally known and used for such purposes, for example indium, indium alloys, tin, or tin-lead alloys.

The temperature to be produced by the direct-current passing through the assembly must be in accordance with the soldering temperature required for the particular solder substance chosen, and the intensity of the electric current, i.e. the voltage applied to the assembly, is selected accordingly. The mechanical pressure applied during the operation serves only for securely holding the components together up to the time where they become joined by the solder bond, the amount of pressure being otherwise irrelevant.

An example of a method according to the invention applied to the combination comprising p-type and n-type $Bi_2Te_3$ as active components A and B, with intermediate pieces C of copper, will be described presently.

The components A and B consisted of cylindrical bodies with a diameter of 10 mm. and a height of 10 mm. The component C consisted of a copper disc with a diameter of 10 mm. and a thickness of about 1 mm. Before performing the soldering operation, the surfaces of components A and B to be subsequently soldered were electroplated with iron and thus provided with a solderable coating of approximately 10 microns thickness. Thereafter the series of components C—A—C—B—C was assembled with a foil of indium-tin (50/50) alloy placed between each two components. The assembly was then held together by slight mechanical pressure. The voltage of 0.5 to 1 volt was applied to the combination resulting in a current of approximately 100 amps. The current was maintained first in one direction for a few seconds, 5 seconds being sufficient. Thereafter the poling of the voltage was reversed, thus passing the current through the assembly in the opposite direction for the same period of time. During this operation, the two contact junctions C—A and B—C or A—C and C—B was sequentially heated to a temperature between 150° and 200° C. which resulted in a perfect soldering of the assembly.

The soldering process was performed in an atmosphere of nitrogen. For intensifying the soldering operation, ultrasonic vibrations with a frequency of approximately 20 kilocycles per second can be applied to the localities to be soldered.

In cases where the intermediate metal pieces C are not used, the method is performed analogously to the one just described, and this also applies to the simultaneous soldering of more than the components used in the foregoing example, except that the voltages to be used are to be additively increased in accordance with the number of individual components being used.

The method according to the invention is suitable not only for the soldering of components used for producing thermopiles for thermoelectric generation of current or for thermoelectric cooling or heating, but generally in cases where solder bonds are to be produced between conductors or semiconductors that are sufficiently different thermoelectrically to produce an appreciable thermoelectric effect. This is the case, for example, when producing contact junctions in the manufacture of electric semiconductor devices such as transistors or rectifiers.

We claim:

1. The method of joining the components of thermoelectric devices by soldering, which comprises the steps of assembling the thermoelectrically different components and placing a layer of solder between the areas to be soldered, pressing the assembly together to form a continuous electric current path, and passing direct current through the assembly in the direction required to make each junction to be soldered a hot junction of the assembly, whereby said junction is soldered by Peltier effect.

2. The method of joining the components of thermoelectric devices by soldering, which comprises the steps of assembling at least three thermoelectric components together with respective intermediate layers of solder, pressing the assembly together to form a continuous electric current path, passing through the assembly a direct current of a given direction to make one of the junctions a hot junction for soldering it by Peltier effect, and thereafter passing the current through the assembly in the opposite direction to solder another junction by making it a hot junction of the assembly.

3. The method of joining the components of thermoelectric devices by soldering, which comprises the steps of assembling the thermoelectrically different components together with intermediate pieces of good conducting metal and placing respective layers of solder between each adjacent area to be soldered, pressing the assembly together to form a continuous electric current path, passing through the assembly a direct current of a given direction to make one of the junctions a hot junction for soldering it by Peltier effect, and thereafter passing the current through the assembly in the opposite direction to solder another junction by making it a hot junction of the assembly.

4. The method of joining the components of thermoelectric devices by soldering, which comprises the steps of assembling the thermoelectrically different components and placing a layer of solder between the areas to be soldered, pressing the assembly together to form a continuous electric current path, placing the assembly in a non-oxidizing atmosphere, and passing direct current through the assembly in the direction required to make each junction to be soldered a hot junction of the assembly, whereby said junction is soldered by Peltier effect.

5. The method of joining the components of thermoelectric devices by soldering, which comprises the steps of assembling the thermoelectrically different components and placing a layer of solder between the areas to be soldered, pressing the assembly together to form a continuous electric current path, subjecting the assembly to ultrasonic vibration and simultaneously passing direct current through the assembly in the direction required to make each junction to be soldered a hot junction of the assembly, whereby said junction is soldered by Peltier effect.

6. The method of joining the components of thermoelectric devices by soldering, which comprises the steps of assembling the thermoelectrically different components and placing a layer of solder between the areas to be soldered, pressing the assembly together to form a continuous electric current path, placing the assembly in a non-oxidizing atmosphere, applying ultrasonic vibration to the assembly and simultaneously passing direct current through the assembly in the direction required to make each junction to be soldered a hot junction of the assembly, whereby said junction is soldered by Peltier effect.

7. A process of making a semiconductor device, comprising assembling a respective surface of a body of p-type $Bi_2Te_3$ semiconductor material and of a body of n-type $Bi_2Te_3$ semiconductor material with a third body of a good electroconductive material therebetween, placing bodies of solder between the third body and the said surfaces, and passing an electric current in one direction and then in the other through said bodies, to cause sequential heating of the solder bodies by the Peltier effect, to melt the solder and join the three bodies.

8. A process of making a thermoelectric device, comprising electroplating with iron a respective surface of a body of p-type $Bi_2Te_3$ semiconductor material and of a body of n-type $Bi_2Te_3$ semiconductor material, assembling said electroplated surfaces with a third body of a good electroconductive material therebetween, placing solder bodies of indium-tin between the third body and the said electroplated surfaces, and passing an electric current in one direction and then in the other, to cause sequential heating of the solder bodies by the Peltier effect, to melt the solder and join the three bodies.

9. A process of making a thermoelectric device, comprising assembling bodies of semiconductor material differing in thermoelectric force with solder in between, and passing an electric current through said bodies in a direction to cause heating by the Peltier effect to melt the solder and join the bodies.

10. The process of claim 9, the semiconductor material being taken from the group consisting of the compounds $Bi_2Te_3$, $Sb_2Te_3$, PbTe, PbSe, ZnSb, CdSb, and solid solutions of these compounds.

11. A process of making a semiconductor device, comprising assembling respective surfaces of bodies of semiconductor material differing in thermoelectric force with a third body of good electronductive material therebetween, disposing bodies of solder between the third body and said surfaces, connecting the assembly in an electric circuit, and passing a current through said bodies in series in one direction and thereafter in the other direction, to cause sequential heating of the solder bodies by the Peltier effect to melt the solder and join the three bodies.

12. The process of claim 11, the semiconductor material being taken from the group consisting of the compounds $Bi_2Te_3$, $Sb_2Te_3$, PbTe, PbSe, ZnSb, CdSb, and solid solutions of these compounds.

References Cited in the file of this patent

FOREIGN PATENTS 705,157    Great Britain _____ Mar. 10, 1954

OTHER REFERENCES

"An Expansion Method of Measuring the Peltier Coefficient," Journal of Scientific Instruments, vol. 5, 1928, pages 315–320.